United States Patent
Saxman et al.

(10) Patent No.: US 9,827,989 B1
(45) Date of Patent: Nov. 28, 2017

(54) VEHICLE NOISE AND VIBRATION INTERFACE OPTIMIZATION

(71) Applicant: GM Global Technology Operations LLC, Detroit, MI (US)

(72) Inventors: Brad A. Saxman, Brighton, MI (US); Scott M. Reilly, Southfield, MI (US); Quentin D. Guzek, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/163,251

(22) Filed: May 24, 2016

(51) Int. Cl.
*B60W 30/20* (2006.01)
*B60W 30/18* (2012.01)

(52) U.S. Cl.
CPC ............ *B60W 30/20* (2013.01); *B60W 30/18* (2013.01); *B60W 2420/54* (2013.01); *B60W 2510/0638* (2013.01); *B60W 2510/20* (2013.01); *B60W 2520/10* (2013.01); *B60W 2600/00* (2013.01); *B60W 2710/025* (2013.01); *B60W 2710/0666* (2013.01); *B60W 2900/00* (2013.01); *B60Y 2300/20* (2013.01); *B60Y 2300/52* (2013.01)

(58) Field of Classification Search
None
See application file for complete search history.

(56) References Cited

U.S. PATENT DOCUMENTS

| | | | | |
|---|---|---|---|---|
| 2005/0164826 A1* | 7/2005 | Albertson | ................ | B60K 6/48 477/2 |
| 2006/0178802 A1* | 8/2006 | Bolander | ............ | B60W 10/023 701/111 |
| 2013/0296121 A1* | 11/2013 | Gibson | ................ | F02D 41/022 477/5 |
| 2014/0041626 A1* | 2/2014 | Wilcutts | ................. | F02D 41/00 123/350 |
| 2014/0088792 A1* | 3/2014 | Saito | ..................... | F16F 15/002 701/1 |

* cited by examiner

Primary Examiner — Edwin A Young

(57) ABSTRACT

A method of optimizing fuel economy and reduced noise and vibration levels in a vehicle includes one or more of the following steps: evaluating an engine speed and a speed of the vehicle, determining if the engine speed and the speed of the vehicle produces a noise level that causes a potential customer complaint, monitoring the noise level in the vehicle, calculating the engine operating condition that causes the noise level, determining if the noise level is above a threshold, adjusting an engine torque or a slip condition of a torque converter for optimal vehicle fuel economy if the noise level is at or below the threshold, and, if the noise level is above the threshold, adjusting the engine torque or the slip condition of the torque converter such that the noise level is at or below the threshold.

20 Claims, 2 Drawing Sheets

VEHICLE NOISE AND VIBRATION INTERFACE OPTIMIZATION

FIELD

Figure 1:
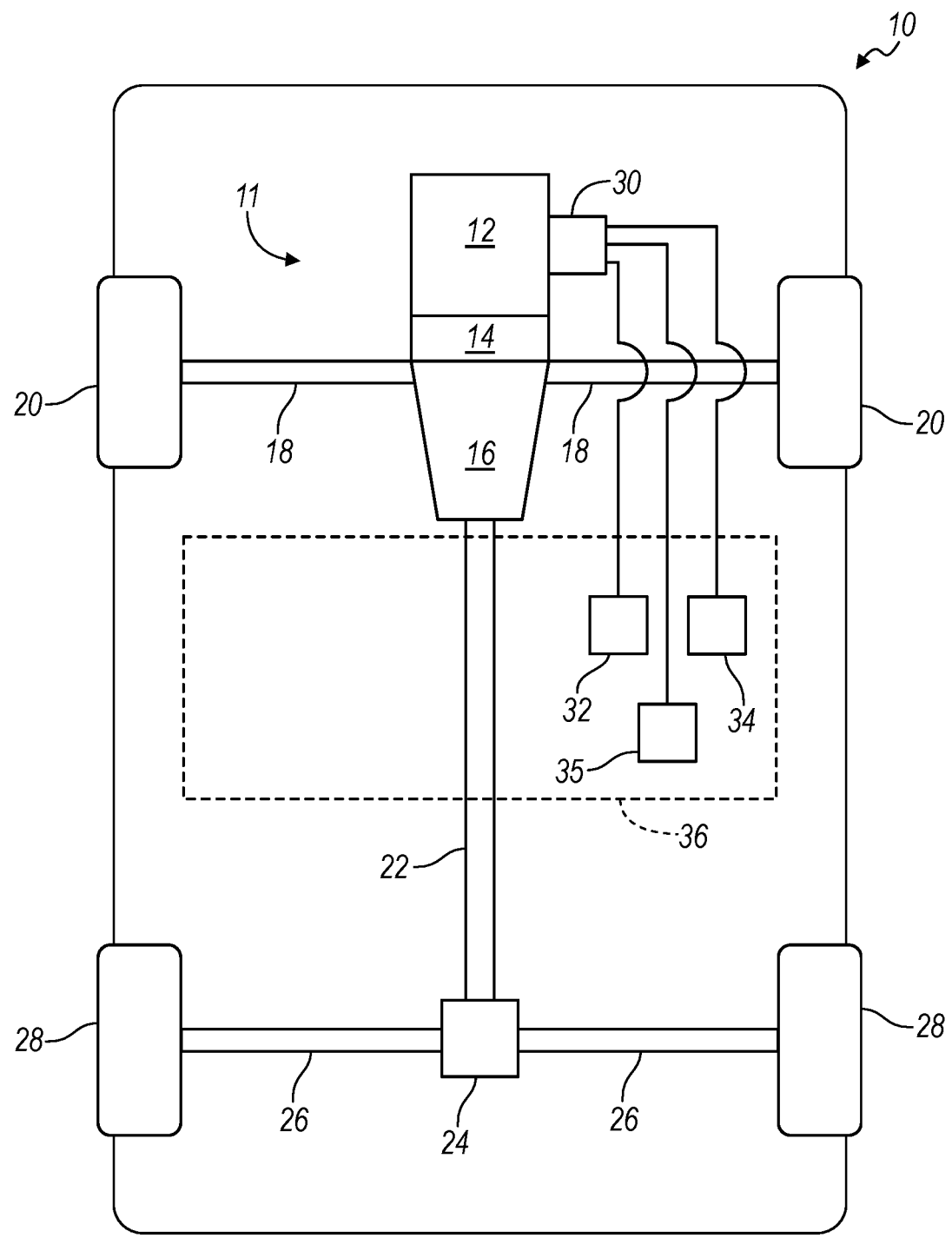

The present disclosure relates to vehicle noise and vibration interface optimization.

BACKGROUND

The statements in this section merely provide background information related to the present disclosure and may not constitute prior art.

A typical vehicle includes many components. The components that make up the vehicle's powertrain may include, for example, an engine, a transmission, and a torque converter that transfers torque from the engine to the transmission. In general, the performance of the engine, torque converter and transmission are adjusted for optimal fuel economy for various operating conditions. Under certain operating conditions, however, the powertrain components may produce disturbances such as noise and vibrations that is noticed by the occupants in the passenger compartment of the vehicle. Some of these disturbances may be sufficient to yield customer complaints.

Accordingly, there is a need in the art for a process that adjusts the performance of the powertrain components to minimize disturbances in the passenger compartment caused by the operation of the powertrain components.

SUMMARY

In one aspect of the present invention a method of optimizing fuel economy and reduced noise and vibration levels in a vehicle includes one or more of the following steps: evaluating an engine speed and a speed of the vehicle, determining if the engine speed and the speed of the vehicle produces a noise level that causes a potential customer complaint, monitoring the noise level in the vehicle, calculating the engine operating condition that causes the noise level, determining if the noise level is above a threshold, adjusting an engine torque or a slip condition of a torque converter for optimal vehicle fuel economy if the noise level is at or below the threshold, and, if the noise level is above the threshold, adjusting the engine torque or the slip condition of the torque converter such that the noise level is at or below the threshold.

The method of optimizing fuel economy and reduced noise and vibration levels in a vehicle may be further characterized by one or any combination of the following features: the noise level is monitored with a microphone; determining if the vehicle is operating at a particular operating condition that generates a vibration level, VIB'1; monitoring the vibration level with a first sensor if the vehicle is operating at a particular operating condition that generates vibration level, VIB'1; the first sensor monitors vibrations levels at a steering wheel of the vehicle; the first sensor is an accelerometer; calculating the engine operating condition that generates the vibration level, VIB'1; determining if the vibration level determined with the first sensor is above a threshold requirement, and, if the vibration level is above the threshold, adjusting the torque of the engine or the slip of the torque converter to reduce the vibration level to a level at or below the threshold; determining if the vehicle is operating at a particular operating condition that generates another vibration level, VIB'2; monitoring the vibration level with a second sensor if the vehicle is operating at a particular operating condition that generates vibration level, VIB'2; the second sensor monitors vibrations levels at a driver's seat track; the second sensor is an accelerometer; calculating the engine operating condition that generates the vibration level, VIB'2; determining if the vibration level determined with the second sensor is above a threshold requirement, and, if the vibration level is above the threshold, adjusting the torque of the engine or the slip of the torque converter to reduce the vibration level to a level at or below the threshold.

Pursuant to another aspect of the present invention, a method of optimizing fuel economy and reduced noise and vibration levels in a vehicle includes one or more of the following steps: monitoring the noise level in the vehicle with a first sensor, adjusting an engine torque or a slip condition of a torque converter for optimal vehicle fuel economy if the noise level is at or below the threshold, and, if the noise level is above the threshold, adjusting the engine torque or the slip condition of the torque converter such that the noise level is at or below the threshold.

The method of optimizing fuel economy and reduced noise and vibration levels in a vehicle may be further characterized by one or any combination of the following features: monitoring the vibration level in the vehicle with an second sensor and, if the vibration level is above a second threshold, adjusting the engine torque or the slip condition of the torque converter such that the vibration level is at or below the second threshold; monitoring the vibration level in the vehicle with an third sensor and, if the vibration level is above a third threshold, adjusting the engine torque or the slip condition of the torque converter such that the vibration level is at or below the third threshold; and the first sensor is a microphone and the second sensor and the third sensor are accelerometers.

Pursuant to yet another aspect of the present invention, an interface device optimizing fuel economy and reduced noise and vibration levels in a vehicle includes a controller with a computer-readable storage medium storing a program that causes the controller to: monitor the noise level in the vehicle with a first sensor; adjust an engine torque or a slip condition of a torque converter for optimal vehicle fuel economy if the noise level is at or below the threshold; and, if the noise level is above the threshold, adjust the engine torque or the slip condition of the torque converter such that the noise level is at or below the threshold.

This aspect may be further characterized by one or any combination of the features described herein, such as: the controller monitors the vibration level in the vehicle with an second sensor and, if the vibration level is above a second threshold, adjusts the engine torque or the slip condition of the torque converter such that the vibration level is at or below the second threshold; and the controller monitors the vibration level in the vehicle with an third sensor and, if the vibration level is above a third threshold, adjusting the engine torque or the slip condition of the torque converter such that the vibration level is at or below the third threshold.

Further features, advantages, and areas of applicability will become apparent from the description provided herein. It should be understood that the description and specific examples are intended for purposes of illustration only and are not intended to limit the scope of the present disclosure.

DRAWINGS

Figure 2:
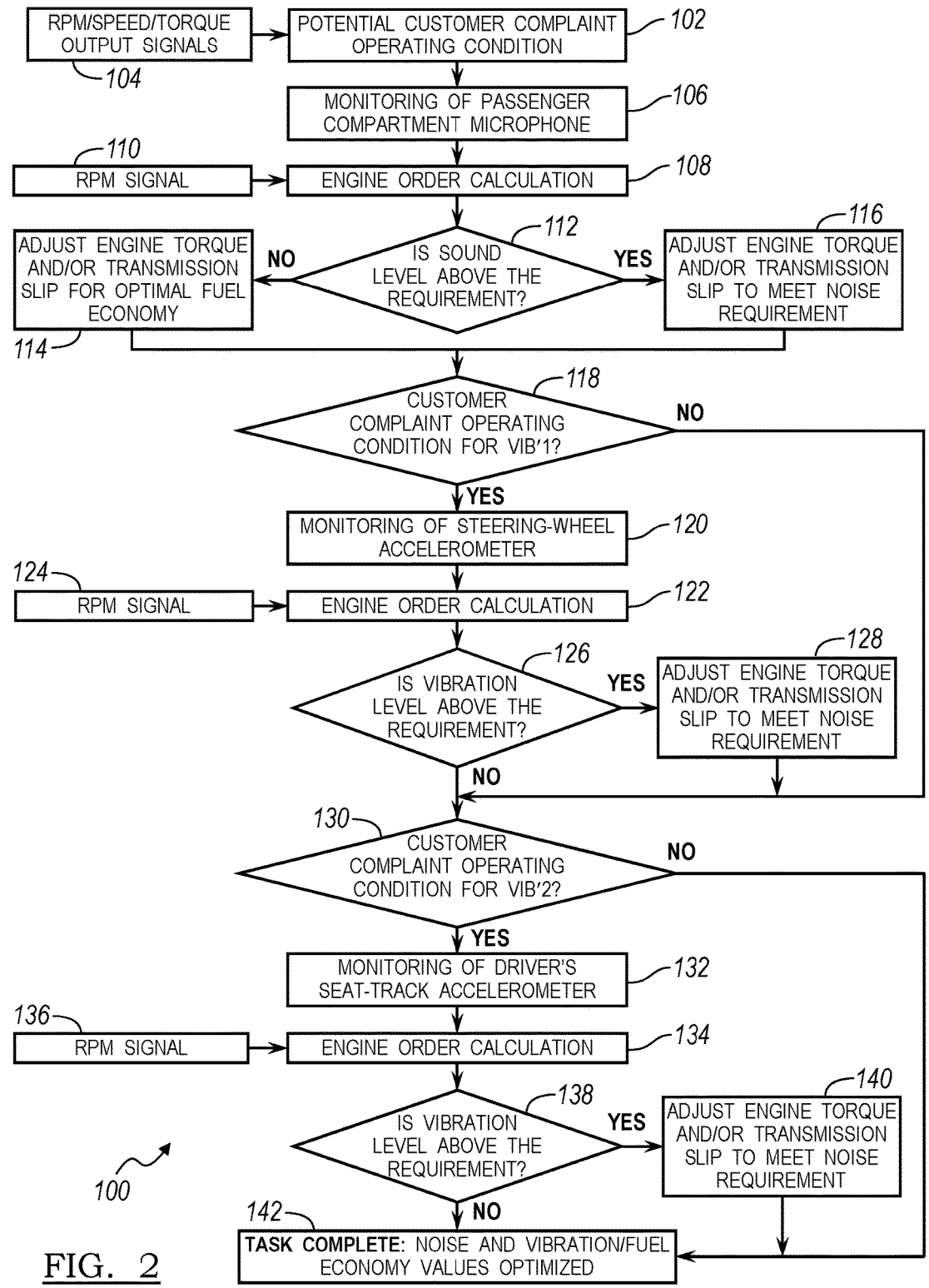

The drawings described herein are for illustration purposes only and are not intended to limit the scope of the present disclosure in any way. The components in the figures are not necessarily to scale, emphasis instead being placed upon illustrating the principles of the invention. In the drawings:

FIG. 1 is schematic overview of a powertrain for a motor vehicle in accordance with the principles of the present invention; and FIG. 2 is flow diagram of a process of operating the powertrain.

DETAILED DESCRIPTION

The following description is merely exemplary in nature and is not intended to limit the present disclosure, application, or uses.

Referring now to FIG. 1, a schematic of a vehicle with an interface that optimizes vehicle noise and vibration embodying the principles of the present invention is illustrated therein and designated at 10.

The vehicle includes a powertrain 11 with an engine 12 and a torque converter 14 that transfers torque to a transmission 16. The transmission 16 supplies various gear or speed ratios to a set of forward wheels 20 through a forward drive axle 18. The transmission 16 also supplies various gear or speed ratios through a drive shaft 22 to a differential 24, which, in turn, provides torque to a set of rear wheels 28 through a rear drive axle 26. Although, the vehicle 10 shown in FIG. 1 includes a powertrain 11 that transmits torque to all four wheels, those skilled in the art will appreciate that the vehicle 10 can be a front-wheel drive vehicle of a rear-wheel drive vehicle. The engine 12 can be a prime mover without departing from the scope of the present invention. For example, the engine 10 can be a conventional internal combustion engine or an electric engine. Further, the invention is not limited to the engine 12, torque converter 14 and transmission 16 arrangement shown in FIG. 1. Other arrangements are contemplated as well. For example, the torque converter may be incorporated in the transmission or may be located on the side of the side of the engine and the transmission.

The vehicle 10 further includes a controller 30 that monitors and controls the operation of the powertrain 11. In the arrangement shown in FIG. 1, the controller 30 receives signals from motion sensors 32 and 34, such as, accelerometers and a microphone 35. The accelerometers 32 and 34 and the microphone 35 are located in any suitable location within a passenger compartment 36 of the vehicle 10 in which the driver and passengers reside during the operation of the vehicle 10.

As described in greater detail below, the accelerometers 32 and 34 and the microphone 35 monitor disturbances in the cabin 36 and transmit signals associated with the disturbances to the controller 30 to optimize engine parameters for maximum fuel economy and acceptable noise and vibration (NV) performance for the vehicle 10. The controller in some arrangements is a computer processor with a computer-readable storage medium that stores the program or algorithm, such as, for example, an active noise control (ANC) algorithm. The ANC algorithm causes the controller to implement a process that employs the input signals from the accelerometers 32 and 34 and the microphone 36 to optimize the amount of slip in the torque converter 14 and/or engine brake torque limits as described below in greater detail.

Turning now to FIG. 2, there is shown a process 100 that is implemented in the controller 30. The process 100 begins with a step 102 that determines a particular vehicle operating condition that may result in a potential customer complaint. For example, the operating condition may be a particular engine rpm or a particular vehicle speed. Step 102 receives output signals regarding the rpm/speed/torque of the vehicle (step 104) and determines if the vehicle is operating at the particular operating condition which may generate a customer complaint. The process 100 then proceeds to a step 106 and monitors the noise level in the passenger compartment 36 with the microphone 35. Such noise monitoring assumes the worst case parameter that influences fuel economy.

Next, the process 100 evaluates the operating order of the engine 12 in a step 108 employing engine rpm information from a step 110 and the monitoring information from the step 106. Specifically, the step 108 calculates the firing conditions of the engine 12 that generates the excitation frequency causing the noise problem determined in the step 106.

The process 100 then proceeds to a decision step 112 and determines if the noise level determined with the microphone 35 within the passenger compartment 36 is above a threshold requirement. If the sound level is above the threshold, the process 100 proceeds to a step 116 and adjusts the torque of the engine 12 and/or the slip of the torque converter 14 to reduce the sound level to a level at or below threshold. If, however, the step 112 determines the sound level is at or below the threshold requirement, the process 100 proceeds to a step 114 and adjusts the torque of the engine 12 and/or the slip of the torque converter 14 for optimal fuel economy.

Subsequently, the process 100 proceeds to a decision step 118 where the process 100 determines if the vehicle 10 is operating at a particular operating condition that generates vibration levels, VIB'1, in the passenger compartment 36 that may elicit a customer complaint. If the decision is no, the process 100 proceeds to another decision step 130 where the process 100 determines if the vehicle 10 is operating at a particular operating condition that generates other vibration levels, VIB'2, in the passenger compartment that may elicit a customer complaint. If the decision in the step 118 is yes, the process 100 monitors the vibration level with the accelerometer 32. In the arrangement shown in FIG. 2, the accelerometer 32 monitors the vibration level of the steering wheel. Next, in a step 122, the process 100 receives rpm information from a step 124 and information from the step 120 to evaluate the operating order of the engine 12. That is, the step 122 calculates the firing conditions of the engine 12 that generates the vibration levels causing the noise problem determined in the step 120.

Next, in a decision step 126 the process 100 determines if the vibration level determined with the accelerometer 32 within the passenger compartment 36 is above a threshold requirement. If the vibration level is above the threshold, the process 100 proceeds to a step 126 and adjusts the torque of the engine 12 and/or the slip of the torque converter 14 to reduce the sound level to a level at or below the threshold. If, however, the step 126 determines the sound level is at or below the threshold requirement, the process 100 proceeds to the step 130.

At the step 130, the process 100 determines if the vehicle 10 is operating at a particular operating condition that generates other vibration levels, VIB'2, in the passenger compartment 36 that may elicit a customer complaint. If the decision in the step 118 is yes, the process 100 monitors the vibration level with the accelerometer 34. In the arrangement shown in FIG. 2, the accelerometer 34 monitors the vibration level of the driver's seat track. Next, in a step 134, the process 100 receives rpm information from a step 136 and information from the step 132 to evaluate the operating order of the engine 12. That is, the step 132 calculates the firing conditions of the engine 12 that generates the vibration levels causing the noise problem determined in the step 132.

Next, in a decision step 138 the process 100 determines if the vibration level determined with the accelerometer 34 within the passenger compartment 36 is above a threshold requirement. If the vibration level is above the threshold, the process 100 proceeds to a step 140 and adjusts the torque of the engine 12 and/or the slip of the torque converter 14 to reduce the sound level to a level at or below the threshold. If, however, the step 138 determines the sound level is at or below the threshold requirement, the process 100 proceeds to the step 130, where the process 100 determines that the task of optimizing fuel economy and reduced noise/vibration levels is complete.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of optimizing fuel economy and reduced noise and vibration levels in a vehicle, the method comprising:
   evaluating an engine speed and a speed of the vehicle;
   determining if the engine speed and the speed of the vehicle are operating at conditions associated with a noise level that causes a potential customer complaint;
   monitoring the noise level in the vehicle;
   calculating an engine operating condition that causes the noise level;
   determining if the noise level is above a threshold;
   adjusting an engine torque or a slip condition of a torque converter for optimal vehicle fuel economy if the noise level is at or below the threshold; and
   if the noise level is above the threshold, adjusting the engine torque or the slip condition of the torque converter such that the noise level is at or below the threshold.

2. The method of claim 1 wherein the noise level is monitored with a microphone.

3. The method of claim 1 further comprising determining if the vehicle is operating at a particular operating condition that generates a vibration level, VIB'1.

4. The method of claim 3 further comprising monitoring the vibration level with a first sensor if the vehicle is operating at a particular operating condition that generates vibration level, VIB'1.

5. The method of claim 4 wherein the first sensor monitors vibrations levels at a steering wheel of the vehicle.

6. The method of claim 4 wherein the first sensor is an accelerometer.

7. The method of claim 4 further comprising calculating the engine operating condition that generates the vibration level, VIB'1.

8. The method of claim 4 further comprising determining if the vibration level determined with the first sensor is above a threshold requirement, and further comprising, if the vibration level is above the threshold, adjusting the torque of the engine or the slip of the torque converter to reduce the vibration level to a level at or below the threshold.

9. The method of claim 4 further comprising determining if the vehicle is operating at a particular operating condition that generates another vibration level, VIB'2.

10. The method of claim 9 further comprising monitoring the vibration level with a second sensor if the vehicle is operating at a particular operating condition that generates vibration level, VIB'2.

11. The method of claim 10 wherein the second sensor monitors vibrations levels at a driver's seat track.

12. The method of claim 10 wherein the second sensor is an accelerometer.

13. The method of claim 10 further comprising calculating the engine operating condition that generates the vibration level, VIB'2.

14. The method of claim 10 further comprising determining if the vibration level determined with the second sensor is above a threshold requirement, and further comprising, if the vibration level is above the threshold, adjusting the torque of the engine or the slip of the torque converter to reduce the vibration level to a level at or below the threshold.

15. A method of optimizing fuel economy and reduced noise and vibration levels in a vehicle, the method comprising:
    monitoring the noise level in the vehicle with a first sensor;
    adjusting an engine torque or a slip condition of a torque converter for optimal vehicle fuel economy if the noise level is at or below a threshold; and
    if the noise level is above the threshold, adjusting the engine torque or the slip condition of the torque converter such that the noise level is at or below the threshold.

16. The method of claim 15 further comprising monitoring the vibration level in the vehicle with a second sensor and, if the vibration level is above a second threshold, adjusting the engine torque or the slip condition of the torque converter such that the vibration level is at or below the second threshold.

17. The method of claim 16 further comprising monitoring the vibration level in the vehicle with a third sensor and, if the vibration level is above a third threshold, adjusting the engine torque or the slip condition of the torque converter such that the vibration level is at or below the third threshold.

18. The method of claim 17 wherein the first sensor is a microphone and the second sensor and the third sensor are accelerometers.

19. An interface device optimizing fuel economy and reduced noise and vibration levels in a vehicle, the device comprising:
    a controller with a computer-readable storage medium storing a program that causes the controller to
    monitor the noise level in the vehicle with a first sensor;
    adjust an engine torque or a slip condition of a torque converter for optimal vehicle fuel economy if the noise level is at or below a threshold; and
    if the noise level is above the threshold, adjust the engine torque or the slip condition of the torque converter such that the noise level is at or below the threshold.

20. The interface device of claim 19 wherein the controller monitors the vibration level in the vehicle with a second sensor and, if the vibration level is above a second threshold, adjusts the engine torque or the slip condition of the torque converter such that the vibration level is at or below the second threshold, and wherein the controller monitors the vibration level in the vehicle with a third sensor and, if the vibration level is above a third threshold, adjusts the engine torque or the slip condition of the torque converter such that the vibration level is at or below the third threshold.

* * * * *